UNITED STATES PATENT OFFICE.

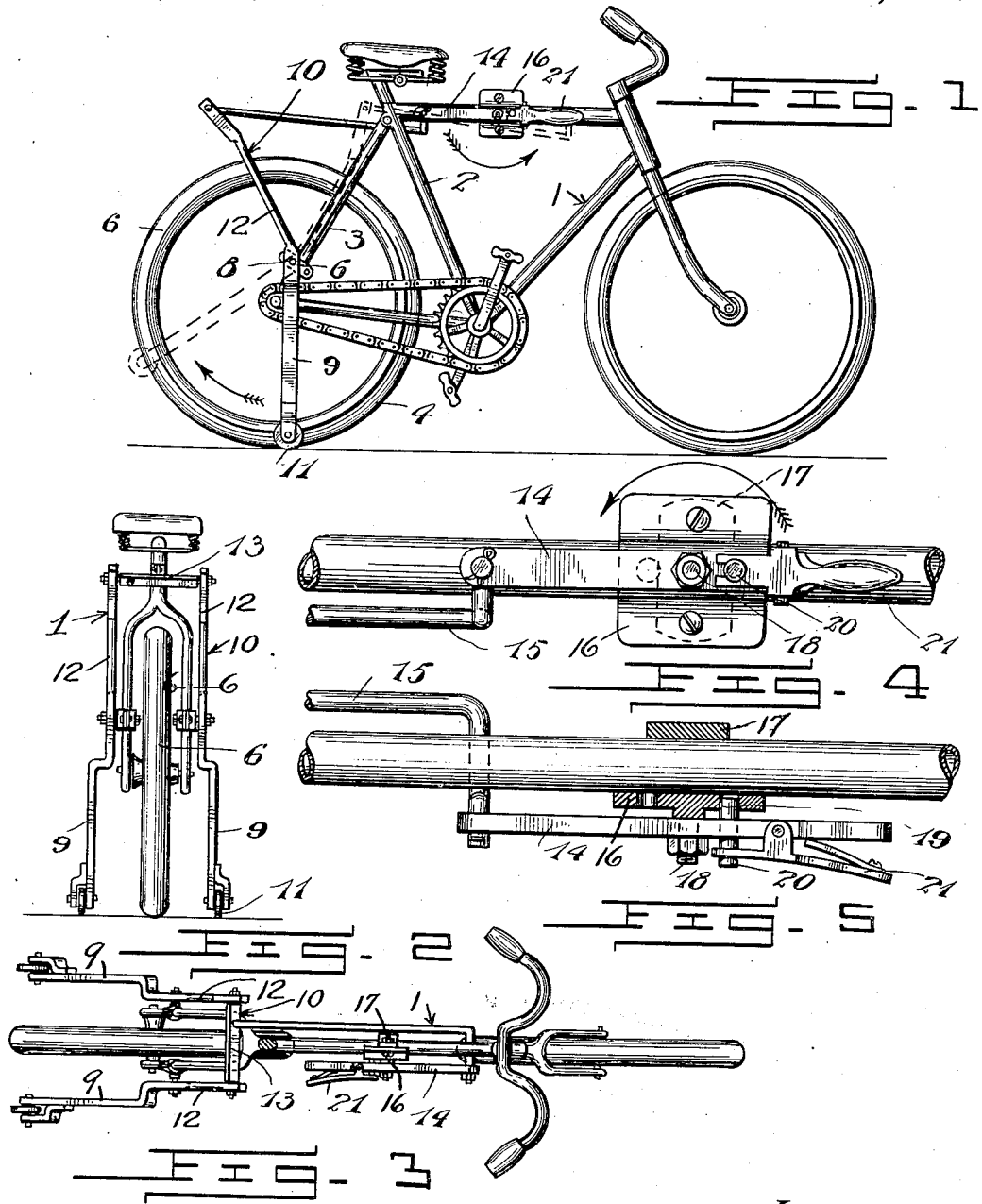

JOHN H. N. CHRISTIAN, OF MONTREAL, QUEBEC, CANADA.

SUPPORT FOR BICYCLES.

1,371,736. Specification of Letters Patent. Patented Mar. 15, 1921.

Application filed July 8, 1920. Serial No. 394,766.

*To all whom it may concern:*

Be it known that I, JOHN H. N. CHRISTIAN, a subject of the King of Great Britain, residing at Montreal, Province of Quebec, Canada, have invented certain new and useful Improvements in Supports for Bicycles; and I do hereby declare that the following is a full, clear, and exact description of the invention, such as will enable others skilled in the art to which it appertains to make and use the same.

The present invention relates to improvements in a support for bicycles, motor cycles and the like.

The primary object of the invention is the provision of a support for bicycles, motorcycles and the like by means of which the same can be supported and held in an upright position without danger of injury caused by falling.

Another object of the invention is the provision of a support such as above referred to which when not in use can be swung to an inoperative position, out of the way of the rider.

Still another object of the invention is the provision of means for swinging the said support to operative or inoperative positions as desired and locking it in such positions.

A further object of the invention is the provision of wheels or rollers upon the lower end of the support whereby the machine can be easily moved about when the support is in operative position.

A still further object of the invention is the provision of a support such as above noted, which will be comparatively simple and inexpensive to manufacture, reliable and efficient in use and readily operated.

With the above and other objects in view, the present invention resides in the novel features of construction, formation, combination and arrangement of parts to be hereinafter more fully described, claimed and illustrated in the accompanying drawing, in which:—

Figure 1 is a side elevation of a bicycle with the invention applied thereto;

Fig. 2 is a rear elevation thereof;

Fig. 3 is a plan view thereof;

Fig. 4 is a side view of the operating lever shown on a larger scale;

Fig. 5 is a plan view of Fig. 4; and,

Fig. 6 is an enlarged sectional view on the line 6—6 of Fig. 2.

Referring to the drawings by corresponding characters of reference throughout the several views, the numeral 1 denotes a bicycle of any well known type, comprising the usual frame 2, including the rear fork 3 mounted upon the usual wheels 4.

Clips 5, comprising curved strips of metal 6 bolted or otherwise secured at their ends as at 7 clamp upon the opposite sides of the rear fork 3 and have trunnions 8 projecting outwardly therefrom upon which the side bars 9 of the support 10 are pivoted.

Rollers 11 are journaled upon the lower ends of the side bars 9 and form a means whereby the bicycle can be readily moved about while the support 10 is in operative position, as shown in Figs. 2 and 3, with the said rollers resting upon the ground. Arms 12 incline rearwardly from the upper ends of the bars 9.

These arms 12 are spaced inwardly of the bars 9 and are connected together by a bar 13 which in turn is connected to the operating lever 14 through the medium of a rod 15. A plate 16 is secured by a clamp 17 to the horizontal bar of the frame 2 and has a central journal 18 formed thereon upon which the lever 14 is pivotally mounted. The plate 16 is provided with a series of holes 19 designed to be engaged by the pawl 20 for locking the lever in its various positions. The pawl is actuated by the hand grip 21 to either lock or release the said lever.

As shown in Fig. 1, the support is in operative position in full lines and it will be understood that by proper manipulation of the lever 14, the same can be swung to the inoperative position, as shown in dotted lines, and locked in either of said positions by the pawl 20.

From the foregoing description taken in connection with the accompanying drawings, it will be manifest that a support for bicycles, motorcycles and the like is provided, which will fulfil all of the necessary requirements of such a device. It should be also understood in this connection, that various minor changes in the specific details of construction can be resorted to within the scope of the appended claims without departing from the spirit or sacrificing of any of the advantages of the invention.

Having thus fully described my invention, what I claim as new and desire to secure by Letters Patent is:—

1. The combination with a bicycle or the like including a rear fork, clamps engaging the opposite sides thereof, a support including side members pivoted to the clamps, rollers journaled at the lower ends of the side members, arms extending from the upper ends of the side members, a bar connecting the arms, a plate secured to the said bicycle, an operating lever pivoted to the plate, a rod connecting the bar which unites the arms of the support with said lever, the plate having holes therein, and a pawl carried by the lever for engagement with the holes, as and for the purpose set forth.

2. The combination with a bicycle or the like including a rear fork, clamps engaging the opposite sides of said fork, a support pivoted to the clamps, rollers journaled at the lower ends of said support, arms extending from the upper end of the support, a bar connecting said arms, a plate secured to a portion of the frame of the bicycle, an operating lever pivoted to said support, a rod connecting the bar which unites the arms of the support to said lever, the plate secured to the frame of the bicycle having openings provided therein, and locking means carried by the lever for engaging with the openings of the plate, substantially as and for the purposes set forth.

In witness whereof I have hereunto set my hand.

JOHN H. N. CHRISTIAN.